United States Patent
Enns et al.

(12)

(10) Patent No.: US 6,937,560 B2
(45) Date of Patent: Aug. 30, 2005

(54) METHOD AND APPARATUS FOR SELECTIVELY ACCELERATING NETWORK COMMUNICATIONS

(75) Inventors: Daniel Albert Enns, Phoenix, AZ (US); Naresh Kumar Jain, Tempe, AZ (US); Robert L. McCollum, Chandler, AZ (US)

(73) Assignee: Comtech EF Data, Inc., Tempe, AZ (US)

( * ) Notice: Subject to any disclaimer, the term of this patent is extended or adjusted under 35 U.S.C. 154(b) by 729 days.

(21) Appl. No.: 09/802,994

(22) Filed: May 22, 2001

(65) Prior Publication Data

US 2003/0161263 A1 Aug. 28, 2003

(51) Int. Cl.[7] .................................................. H04L 1/00

(52) U.S. Cl. .................. 370/229; 370/395.42

(58) Field of Search ......................... 370/229, 231–235, 370/316, 360, 395.4, 395.21, 395.41, 395.42, 395.43; 709/101, 105, 106, 107, 227–229, 235

(56) References Cited

U.S. PATENT DOCUMENTS 6,327,364 B1 * 12/2001 Shaffer et al. ......... 379/265.02

* cited by examiner

*Primary Examiner*—Wellington Chin
*Assistant Examiner*—Brenda Pham
(74) *Attorney, Agent, or Firm*—A. Mitchell Harris; Jeffrey D. Moy; Weiss, Moy & Harris, P.C.

(57) ABSTRACT

A method and apparatus for selectively accelerating network communications provides improved operation of network communications through channels with long delays, such as a satellite communications channel. A configuration management mechanism provides a selection of acceleration configuration for particular addresses of devices that may communicate through the communications channels. Acceleration may be bypassed for particular addresses or classes of devices within the network and priorities may be assigned, permitting a cut-off of acceleration when a threshold number of sessions is reached. The method and system may also allow a higher priority class of session to preempt lower priority session by removing resources from the lower priority session and assigning them to the higher priority session. The data rate of the lower priority session is then lowered (due to the absence of acceleration or reduced buffer size) to reduce traffic flow.

19 Claims, 3 Drawing Sheets

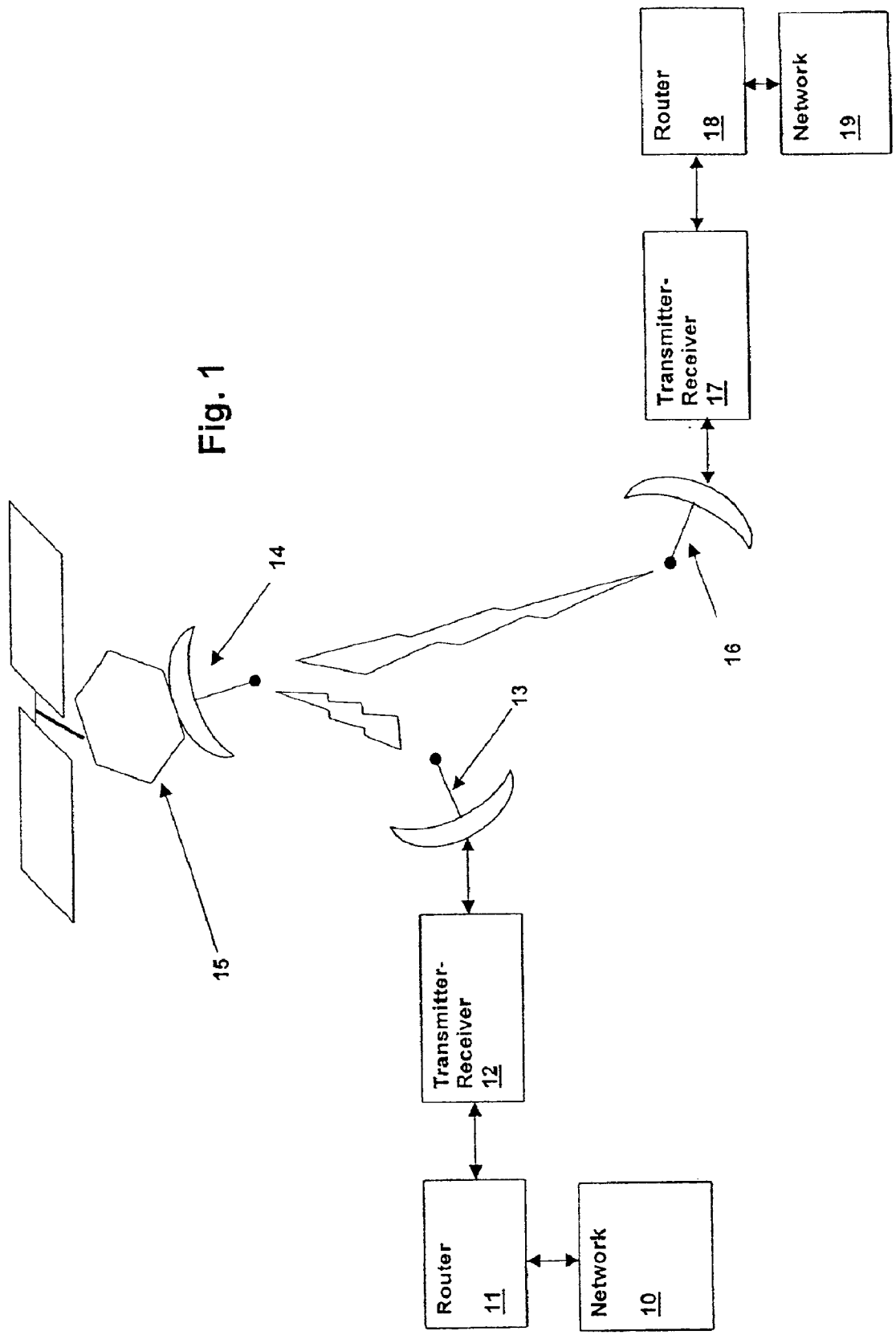

| S. No. | Source IP | Destination IP | Source Port | Destination Port | Maximum Sessions Accelerated | Max. Acceleration Per Session (kbit/s) | Pre Allocate Resources | Comments |
|---|---|---|---|---|---|---|---|---|
| 1 | 172.16.0.0/16 | * | * | 20 | 5 | 512 | YES | The system will accelerate up to 5 ftp sessions originating from network 172.16.0.0, each up to 512 kbit/s. Rest will be bypassed. |
| 2 | * | 10.0.0.0/24 | * | 80 | 10 | 256 | NO | The system will attempt to accelerate up to 10 http sessions terminating on network 10.0.0.0, each up to 256 kbit/s. Rest will be bypassed. |
| 3 | 192.168.10.0/8 | * | * | * | * | * | N/A | The system will attempt to accelerate all TCP sessions originating from network 192.168.10.0 subject to resource availability. |
| 4 | * | * | * | 20 | * | * | N/A | This is a catch all for ftp. The system will attempt to accelerate all ftp sessions subject to resource availability. |
| 5 | * | * | * | * | * | * | N/A | This is a catch all for all TCP sessions. The system will attempt to accelerate all TCP sessions subject to resource availability. |

Fig. 2

METHOD AND APPARATUS FOR SELECTIVELY ACCELERATING NETWORK COMMUNICATIONS

BACKGROUND OF THE INVENTION

1. Field of the Invention

The present invention relates generally to networking systems, and more specifically, to a method and system for selectively accelerating network communications.

2. Background of the Invention

Present-day network systems communicate through a variety of protocols and channels in order to interconnect computers, telephony devices and other systems that required data or voice communications. Quality of Service (QoS) is a designator that is used in network systems to assign or request desirable data transfer characteristics, such as delay and bandwidth characteristics for a given channel. Service quality can be assigned on a per-user basis to provide several levels of interconnect performance conforming to desired performance levels. Users may be charged fees for different performance levels. For example, a business connection or Internet Service Provider (ISP) serving multiple users will have a higher desired performance level than an individual residential customer, and the fees for such performance can be assigned accordingly.

QoS levels are typically set within a network by a configuration manager, which can be coupled to the network or coupled to a network component such as a router. The configuration manager is a program running on a computer that permits setting of network addresses such as Internet Protocol (IP) addresses, QoS requirements for a given connection between addresses and protocols to be used for communication between networked devices.

Within a wired network, QoS requirements related to TCP/IP networking performance are not as difficult to meet as with a satellite communications coupled network or with wireless networking systems. Communications using the transmission control protocol (TCP) require a one-to-one acknowledge response for each TCP segment (packet) communicated. The delays associated with satellite communications can make it impossible to efficiently utilize available bandwidth in the channel, since each end station must wait for responses for every transmitted TCP segment. Proprietary accelerated protocols can be used over the satellite portion of the network that alleviate the performance bottlenecks caused by acknowledgement delay, but use of these protocols is very processor and memory intensive. In order to avoid higher costs of processing power and memory for temporarily holding TCP segments until their receipt is confirmed on the other side of a satellite communications channel and for performing packet processing, it is desirable to provide an alternative to a completely accelerated communications channel or an communications channel that uses no acceleration.

Therefore, it would be desirable to provide a system and method for selectively accelerating network communications, so that satellite channels and other communications channels with long delays can be used for network communications, while not requiring the processing power and memory required to accelerate transmissions for all communications through a channel.

SUMMARY OF THE INVENTION

The above objective of selectively accelerating network communications is achieved in a method of network communications and a network communications system. The method of network communications classifies a communications session, and selectively accelerates the communications session in conformity with the classification of the session. The network communications system includes a packet processor that classifies a communications session and selectively encapsulates and decomposes transmissions in an accelerated format in conformity with the session classification.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

FIG. 1 is a block diagram depicting a satellite network communications channel within which the present invention may be embodied.

FIG. 2 is a pictorial diagram depicting a configuration manager configuration table in accordance with a preferred embodiment of the invention.

DETAILED DESCRIPTION OF THE PREFERRED EMBODIMENTS

Figure 3:
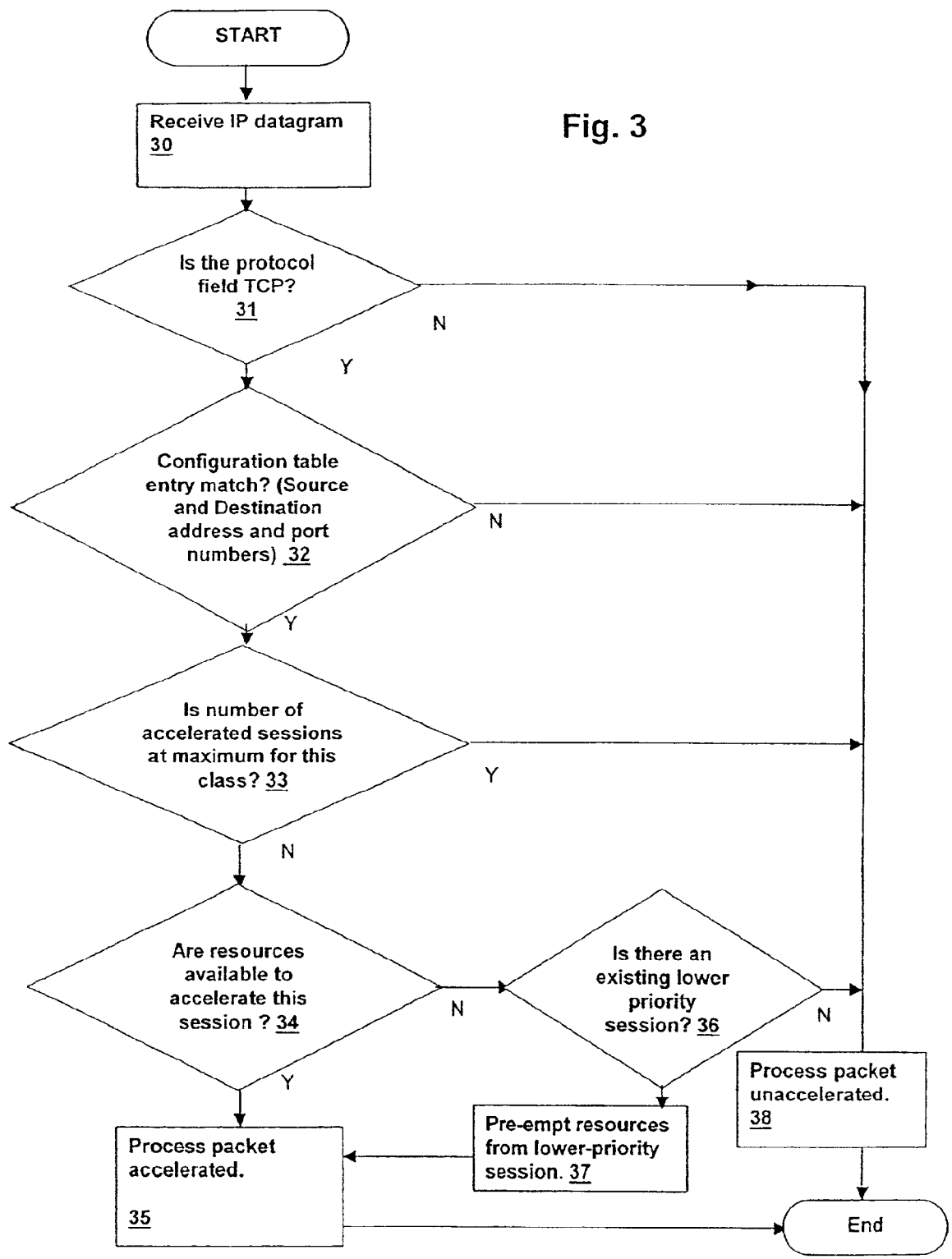
FIG. 3 is a flowchart depicting operation of a packet processor in accordance with a preferred embodiment of the invention.

Referring now to the figures and in particular to FIG. 1, a satellite network communications channel within which the present invention may be embodied is depicted in a block diagram. A first uplink/downlink includes a router 11, a transmitter-receiver 12 and an antenna 13. Router 11 is coupled to a network 10 which can interchange packets with the first uplink/downlink. A satellite 15 contains a transmitter-receiver, transponder or other suitable circuitry for receiving and transmitting information using an antenna 14. The configuration of a separate transmitter-receiver 12 and router 11 is an illustrative configuration. Other configurations such as one that integrates a router with a transmitter-receiver are contemplated by the present invention and represent additional embodiments thereof.

Packets transmitted via first uplink/downlink to satellite 15 may be forwarded to a second uplink/downlink that includes a router 18, a transmitter-receiver 17 and an antenna 16. Router 18 is coupled to a network 19 which can interchange packets with the second uplink/downlink. While the illustrative embodiment described in this section uses TCP/IP protocol, it will be understood by those of ordinary skill in the art that the present invention may be used with other protocols, and that the advantages of the present invention are particularly applicable to those protocols that require the uplink to maintain storage of transmitted packets until a confirmation that the packet has been received by the downlink side of the communications channel. Additionally, while the illustrative embodiment is directed to communications channels involving a satellite uplink/downlink it will be understood by those of ordinary skill in the art that the present invention may be used with other communications channels, and that the advantages of the present invention are particularly applicable to those communications channels that have a long transmission/reception delay.

Typically, satellite links for networks using transmission control protocol (TCP) must wait for an acknowledgement to be received for each TCP segment transmitted through the link. For example, a TCP segment transmitted from network 10 to network 19 will be acknowledged at network 10 after a delay greater than twice the propagation delay from antenna 13 to antenna 16. The additional delay over propagation delay is produced by the satellite systems, as well as router delays in the first and second uplink/downlink. The resulting transmission delay can be obviated by using a proprietary protocol over the satellite communications channel that does not require a one-to-one packet acknowledgment, yet provides guaranteed packet delivery. However, processing power required within router 11 and router 18 and memory requirements become excessive. Memory requirements are increased, since each router must maintain tables of packets pending acknowledgement via the proprietary protocol from the other end of the satellite communications channel.

The present invention overcomes these limitations by selectively accelerating some sessions to provide higher quality of service (QoS). While acceleration may be turned off when memory or processing requirements are taxed, this produces a random performance per session. It is desirable to provide connections with consistently high QoS for some users, who will pay for the service accordingly. It is also desirable to provide connections with a lower QoS for users who are more cost-conscious. The lower QoS connections may be upgraded when the communications channel is not being taxed by high demands from high performance connections, or the performance may be permanently fixed at a lower level.

Referring now to FIG. 2, a configuration table that is managed by a configuration manager in accordance with a preferred embodiment of the invention is shown. The configuration manager is a program that may configure the operation of router 11 or router 18 via standard network management protocol (SNMP), a console interface via a direct serial or Ethernet connection, via a TELNET session, or via a web-based interface accessed from a management IP address. The packet processor makes decisions in accordance with configuration tables produced by the configuration manager. These tables allow the characterization of sessions by source IP address, source port number, destination IP address and destination port number. The IP addresses may be a fixed number, range of addresses or a wildcard indicating all possible values, wherein the masks for ranges are indicated by a "/" and wildcards are indicated by an "*". Port numbers may be fixed numbers or wildcards. Transmission types are determined by the destination port number in accordance with RFC 1700, a specification maintained by the Network Working Group. For example, a destination port number of 20 indicates an FTP session, while a destination port number of 80 indicates an HTTP session.

The left-hand side of the configuration table depicts a table entry number, with higher priority assignments at the top of the table (lower entry numbers). Exemplary table entry 1 configures the packet processor such that up to five ftp sessions originating from source IP address range 172.16.0.0/16 will be accelerated with a maximum rate per session of 512 kilobits per second for each transmission. Once five sessions have been established from this IP address range, any new sessions that are established from this IP address range will be not be accelerated until one of the five existing sessions has been terminated, thereby limiting the allocation of acceleration processing power and memory for this IP address.

The data rates indicated in the configuration table are approximate maximum levels of performance and are tailored by setting the buffer size for the session. Since buffering is required to overcome the delays associated with propagating packets through a satellite communications channel, controlling buffer size for a session effectively controls the throughput. The final column entry for controlling sessions originating from the specified source IP address range is whether or not resources are pre-allocated for the specified address range. If the resources are pre-allocated, sessions originating from the specified address range are guaranteed their QoS since the resources will always be available. The pre-allocation can be implemented by permanently reserving resources within the system based on the configuration table. Alternatively a higher priority session does not have associated pre-allocated resources may be accelerated by pre-empting resources from a lower priority session that is already in progress.

Exemplary table entry 2 in FIG. 2 shows a configuration in which the packet processor will attempt to accelerate up to 10 HTTP sessions terminating in destination address range 10.0.0.0/24 are accelerated to a maximum data rate of 256 kilobits per second per session. Exemplary table entry 3 will attempt to accelerate all sessions originating from IP address range 192.168.10.0/8 subject to resource availability.

Exemplary table entry 4 in FIG. 2 is a "catch-all" configuration for FTP sessions. The system will attempt to accelerate all FTP sessions subject to resource availability and exemplary table entry 5 is a catch-all for all TCP sessions, causing all TCP sessions to be accelerated subject to remaining resources.

Referring now to FIG. 3, a flowchart of a method of packet processing in a network is depicted in accordance with a preferred embodiment of the invention. The packet processor receives an IP datagram (step 30). The packet processor then checks the IP protocol field to determine if TCP is the higher level protocol (per RFC 1700, the TCP protocol number is 6). If the protocol is not TCP (decision 31), the datagram is dispatched for normal processing (step 38). Next, the packet processor examines the source IP address, destination IP address, the source TCP port number and the destination TCP port number contained within the IP datagram. If a configuration table match is found (decision 32), the IP datagram is selected for further processing, otherwise the IP datagram is transmitted without acceleration (e.g., normal bypass processing) (step 38). If the number of accelerated sessions for that classification has reached a maximum threshold value (decision 33), the packet is likewise processed without acceleration (step 38). Finally, if there are no available resources (decision 34) and there is not an existing lower priority session (decision 36), the packet is also processed without acceleration (step 38). Otherwise, if resources are available (decision 34) the packet is processed using an acceleration mechanism (step 35) that terminates the TCP session locally, converts the data to a proprietary protocol for transmission over the satellite communications channel and recreates the TCP session at the other side of the satellite communication for transmission to the attached network, to provide accelerated packet transmission through the channel. If resources are not available (decision 34) but a lower priority session exists (decision 36), then resources are pre-empted from the lower priority session (step 37) and the packet is likewise accelerated (step 35). The above method is an illustrative embodiment and other variations may be performed which conform to preferred embodiments of the present invention. For example, the decision tree for packet processing may be performed in different orders without departing from the scope of the present invention.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method of network communications, comprising:
classifying a communications session to produce a session classification;
selectively accelerating said communications session in conformity with said classification; and
determining whether or not a threshold number of sessions has been reached for said session classification, and wherein said acceleration is disabled for said communications session in response to determining that said threshold number of sessions has been reached.

2. A method of network communications, comprising:
classifying a communications session to produce a session classification;
selectively accelerating said communications session in conformity with said classification; and
in response to said classifying, determining whether or not said session classification is of a class selected for bypassing said acceleration, and wherein said accelerating is disabled for said communications session in response to determining that said class is selected for bypassing said acceleration.

3. A method of network communications, comprising:
classifying a communications session to produce a session classification; and
selectively accelerating said communications session in conformity with said classification, wherein said classifying determines that said communications session is a low priority type of session and further comprising determining whether or not resources are available for accelerating said communications session, wherein said accelerating is performed for said communications session in response to determining said resources are available, and wherein said accelerating may be ceased in response to a request to accelerate a higher-priority session.

4. The method of claim 3, wherein said classifying classifies said communications session by type of transmission by examining a destination port number, and wherein said accelerating is selectively performed in conformity with said type of transmission.

5. A method of network communications, comprising:
classifying a communications session to produce a session classification;
selectively accelerating said communications session in conformity with said classification; and wherein said communication session is a transmission control protocol (TPC) session, and wherein said acceleration is performed by
locally terminating said TCP session,
converting a TCP datum to a proprietary protocol datum for transmission over a satellite communications channel, and
reconstructing said TCP datum at a receiving end of said satellite communications channel.

6. A method of network communications, comprising:
classifying a communications session to produce a session classification; and
selectively accelerating said communications session in conformity with said classification, wherein said classifying further determines that said communications session is to be coupled through a satellite communications channel, and wherein said accelerating is selectively performed in conformity with said determination.

7. A method of network communications, comprising:
classifying a communications session to produce a session classification; and
selectively accelerating said communications session in conformity with said classification, wherein said acceleration has a controllable data rate configured by adjusting a buffer size associated with said communications session.

8. A method of network communications, comprising:
classifying a communications session to produce a session classification;
selectively accelerating said communications session in conformity with said classification;
pre-empting resources from an existing communications session of lower-priority than said communications session and using them for said accelerating; and
throttling said existing communications session by using a transmission control protocol (TCP) flow control mechanism.

9. A system comprising:
a packet processor for processing communications packets; and
a network coupled to said packet processor, wherein said packet processor classifies a communications session to produce a session classification and selectively accelerates said session in conformity with said session classification, wherein said packet processor further determines whether or not a threshold number of sessions has been reached for said session classification, and wherein said packet processor does not accelerate said communications session if said threshold number of sessions has been reached.

10. A system comprising:
a packet processor for processing communications packets; and
a network coupled to said packet processor, wherein said packet processor classifies a communications session to produce a session classification and selectively accelerates said session in conformity with said session classification, wherein said packet processor further determines whether or not said session classification is of a class selected for bypassing said acceleration, and wherein said packet processor does not accelerate said communications session if class is selected for bypassing said acceleration.

11. A system comprising:
a packet processor for processing communications packets; and
a network coupled to said packet processor, wherein said packet processor classifies a communications session to produce a session classification and selectively accelerates said session in conformity with said session classification, wherein said packet processor determines that said communications session is a low priority type of session and that resource availability is less than a threshold value, and wherein said packet processor does not accelerate said communications session in response to determining that said communications session is a low priority type of session and that said resource availability is less than a threshold value.

12. A system comprising:

a packet processor for processing communications packets; and a network coupled to said packet processor, wherein said packet processor classifies a communications session to produce a session classification and selectively accelerates said session in conformity with said session classification, wherein said packet processor classifies said communications session by type of transmission by examining a destination port number, and wherein said packet processor does not accelerate said communications session in response to determining that said communications session is a lower priority type of transmission.

13. A system comprising:

a packet processor for processing communications packets; and a network coupled to said packet processor, wherein said packet processor classifies a communications session to produce a session classification and selectively accelerates said session in conformity with said session classification, wherein said packet processor processes an transmission control protocol (TPC) session, and wherein said acceleration is performed by locally terminating said TCP session, converting data to a proprietary for transmission over a satellite communications channel for subsequent reception and reconstruction of said TCP session by another packet processor at a receiving station.

14. A system comprising:

a packet processor for processing communications packets;

a network coupled to said packet processor, wherein said packet processor classifies a communications session to produce a session classification and selectively accelerates said session in conformity with said session classification; and a satellite communication channel, wherein said packet processor determines that said communications session is to be coupled through said satellite communication channel, and wherein said packet processor accelerates said communications session in conformity with said determination.

15. A system comprising:

a packet processor for processing communications packets; and a network coupled to said packet processor, wherein said packet processor classifies a communications session to produce a session classification and selectively accelerates said session in conformity with said session classification, wherein said packet processor accelerates said communication session by removing resources used by an existing communication session and throttles said existing communications session by using a transmission control protocol (TCP) flow control mechanism.

16. A network device comprising:

a plurality of network ports for connecting network devices;

a packet processor coupled to said plurality of network ports for processing packets communicated from or to said ports;

a memory coupled to said packet processor for storing data and program instructions for execution by said packet processor;

a satellite communications interface for coupling said packet processor to a satellite communications channel; and program means executed by said packet processor for selectively accelerating a communications session between at least one of said plurality of network ports and said satellite communications interface, wherein said selective acceleration is performed in response to a classification of said communications session.

17. A computer program product comprising program instructions encoded in signal bearing media for execution by a packet processor, wherein said program instructions selectively accelerate a communications session for transmission over a satellite communications channel, wherein said selective acceleration is performed in response to a classification of said communications session.

18. A configuration manager comprising program instructions encoded in signal bearing media for execution by a processor coupled to a configuration console, wherein said program instructions produce configuration data for directing a packet processor to selectively accelerate a communications session for transmission over a satellite communications channel, wherein said selective acceleration is performed in response to a classification of said communications session.

19. The configuration manager of claim 18, wherein said configuration console is a web page displayed on a browser coupled to the Internet, and wherein said configuration data is produced by entering data within fields on said web page for transmission to said packet processor.

* * * * *

UNITED STATES PATENT AND TRADEMARK OFFICE
CERTIFICATE OF CORRECTION

PATENT NO. : 6,937,560 B2  Page 1 of 1
APPLICATION NO. : 09/802994
DATED : August 30, 2005
INVENTOR(S) : Daniel Albert Enns It is certified that error appears in the above-identified patent and that said Letters Patent is hereby corrected as shown below:

Col. 5, lines 50-64 Please replace claim 5 with the following language for claim 5:

A method of network communications, comprising: classifying a communications session to produce a session classification; selectively accelerating said communications session in conformity with said classification; and wherein said communication session is a transmission control protocol (TCP) session, and wherein said acceleration is performed by locally terminating said TCP session, converting a TCP datum to a proprietary protocol datum for transmission over a satellite communications channel, and reconstructing said TCP datum at a receiving end of said satellite communications channel.

Col. 7, lines 17-32 Please replace claim 13 with the following language for claim 13:

A system comprising: a packet processor for processing communications packets; and a network coupled to said packet processor, wherein said packet processor classifies a communications session to produce a session classification and selectively accelerates said session in conformity with said session classification, wherein said packet processor processes an transmission control protocol (TCP) session, and wherein said acceleration is performed by locally terminating said TCP session, converting data to a proprietary for transmission over a satellite communications channel for subsequent reception and reconstruction of said TCP session by another packet processor at a receiving station.

Signed and Sealed this

Twenty-second Day of June, 2010

David J. Kappos
*Director of the United States Patent and Trademark Office*